US007260023B2

(12) United States Patent
Jones et al.

(10) Patent No.: US 7,260,023 B2
(45) Date of Patent: Aug. 21, 2007

(54) REMOTE UNDERWATER LASER ACOUSTIC SOURCE

(75) Inventors: Theodore G Jones, Alexandria, VA (US); Antonio C Ting, Silver Spring, MD (US); Phillip A Sprangle, Great Falls, VA (US); Leonard Dale Bibee, Slidell, LA (US); Joseph R Penano, Springfield, VA (US)

(73) Assignee: United Statesof America as Represented by the Secretary of the Navy, Washington, DC (US)

( * ) Notice: Subject to any disclaimer, the term of this patent is extended or adjusted under 35 U.S.C. 154(b) by 126 days.

(21) Appl. No.: 11/268,400

(22) Filed: Nov. 2, 2005

(65) Prior Publication Data

US 2006/0096802 A1 May 11, 2006

Related U.S. Application Data

(60) Provisional application No. 60/624,496, filed on Nov. 2, 2004.

(51) Int. Cl.
*G01H 9/00* (2006.01)

(52) U.S. Cl. ...................................................... 367/149

(58) Field of Classification Search ................. 367/149
See application file for complete search history.

(56) References Cited

U.S. PATENT DOCUMENTS 3,392,368 A 7/1968 Brewer et al.
3,532,181 A 10/1970 DeMaria et al.
4,137,991 A 2/1979 Melcher et al.
4,608,979 A 9/1986 Breidenthal et al.
6,317,388 B1 11/2001 Woodsum et al.
6,385,131 B1 5/2002 Woodsum et al.
6,396,770 B1 5/2002 Carey et al.
2004/0040379 A1* 3/2004 O'Donnell et al. ........... 73/627
2006/0096802 A1* 5/2006 Jones et al. ................. 181/142

OTHER PUBLICATIONS

Jones, T. G., Grun, J., Bibee L. D., Manka, C., Landsberg, A., and Tam, D., "Laser-Generated Shocks and Bubbles as Laboratory-Scale Models of Underwater Explosions," Shock and Vibration, 10(3), 147-157 (2003).

A. Vogel, S. Busch, and U. Parlitz, "Shock wave emission and cavitation bubble generation by picosecond and nanosecond optical breakdown in water", J. Acoustical Soc. Am., vol. 100, Issue 1, pp. 148-165, Jul. 1996.

(Continued)

*Primary Examiner*—Daniel Pihulic
(74) *Attorney, Agent, or Firm*—John J Karasek; Sally A Ferrett

(57) ABSTRACT

A method for generating an acoustic source in a liquid includes transmitting an optical pulse through the liquid so the optical pulse reaches $I_{LIB}$ through pulse compression and ionizes a liquid volume. The pulse compression is achieved through at least one of a) group velocity dispersion induced longitudinal compression of a frequency chirped optical pulse and b) transverse self focusing via a nonlinear optical Kerr effect. The acoustic source can be generated at a controllable remote location many meters from the optical source. The optical source can be a laser or other suitable optical device.

29 Claims, 7 Drawing Sheets

OTHER PUBLICATIONS

S.V. Egerev, "In search of a noncontact underwater acoustic source", Acoustical Physics, vol. 49, No. 1, pp. 51-61, 2003.

A. Siegman, Lasers, pp. 375-386, University Science Books, 1986.

P. Sprangle, J.R. Penano, B. Hafizi, "Propagation of intense short laser pulses in the atmosphere", Physical Review E, vol. 66, pp. 046418-1 to -21, 2002.

P.K. Kennedy, "A First Order Model for Computation of Laser-Induced Breakdown Thresholds in Ocular and Aqueous Media: Part 1—Theory", IEEE Journal of Quantum Electronics, vol. 31, No. 12, pp. 2241-2249, Dec. 1995.

P.K. Kennedy, "A First Order Model for Computation of Laser-Induced Breakdown Thresholds in Ocular and Aqueous Media: Part II—Comparison to Experiment", IEEE Journal of Quantum Electronics, vol. 31, No. 12, pp. 2250-2257, Dec. 1995.

C.A. Sacchi, "Laser-induced electric breakdown in water" , J. Optical Society of America B, vol. 8, No. 2, pp. 337-345, (1991).

T.G. Jones, J. Grun, and C. Manka, "Feasibility Experiments for Underwater Shock and Bubble Generation with a High-Power Laser", Naval Research Laboratory Memorandum Report No. 6790-99-8317, Apr. 1999.

G. Fibich, "Time Dispersive Effects in Ultrashort Laser-Tissue Interactions", Advances in Heat and Mass Transfer in Biotechnology, HTD 322 and BTD 32:27-31, 1995.

C. Mobley, "The Optical Properties of Water", Handbook of Optics, vol. 1, Chap. 43, Michael Bass, ed., McGraw-Hill, New York, 1995, pp. 43.3-43.52.

* cited by examiner

REMOTE UNDERWATER LASER ACOUSTIC SOURCE

CROSS-REFERENCE TO RELATED APPLICATIONS

This Application is a Non-Prov of Prov (35 USC 119(e)) application No. 60/624,496 filed on Nov. 2, 2004 and incorporated herein by reference in its entirety.

BACKGROUND OF THE INVENTION

Underwater acoustic sources are useful in the marine environment both near the surface and undersea. For example, acoustic sources can be used to mark the location of an object for salvage, as navigational aids for undersea vehicles, and for other applications.

Current underwater acoustical sources are discrete devices that are dropped from ships or aircraft, intended to sink to a location where they begin transmitting.

S. V. Egerev describes development of noncontact laser acoustic sources in "In Search of a Noncontact Underwater Acoustic Source", Acoustical Physics, vol. 49, issue 1, pages 51-61, 2003. A laser-based ultrasonic and hypersonic sound generator is discussed in U.S. Pat. No. 3,392,368 to Brewer et al. Laser induced electric breakdown in water is discussed by C. A. Sacchi in the Journal of the Optical Society of America B, Vol. 8, No. 2, February 1991, pages 337-345. P. K. Kennedy discusses laser induced breakdown thresholds in ocular and aqueous media in IEEE Journal of Quantum Mechanics, Vol. 31, No. 12, December 1995, pages 2241-2249 and 2250-2257. A. Vogel and S. Busch discuss shock wave emission and cavitation generation by picosecond and nanosecond optical breakdown in water in J. Acoustical Society of America, Vol. 100, Issue 1, July 1996, pages 148-165.

T. G. Jones, J. Grun, L. D. Bibee, C. Manka, A. Landsberg, and D. Tam discuss laser-generated shocks and bubbles as laboratory-scale models of underwater explosions in Shock and Vibration, IOP Press, Vol. 10, pages 147-157, 2003.

P. Sprangle, J. R. Penano, and B. Hafizi discuss propagation of intense short laser pulses in the atmosphere in Physical Review E, Vol. 66, 2002, pages 046418-1-046418-21. The optical Kerr effect, a non-linear change in the refractive effect at high intensity, is discussed by Siegman, Lasers, pages 375-386, 1986.

BRIEF SUMMARY OF THE INVENTION

A method for generating an acoustic source in a liquid, the method comprising: transmitting an optical pulse through the liquid; the optical pulse reaching ILIB through pulse compression and ionizing a liquid volume, thereby generating an acoustic pulse, wherein the pulse compression is achieved through at least one of optical group velocity dispersion induced longitudinal compression of a frequency chirped optical pulse and transverse self focusing via a nonlinear optical Kerr effect.

Another embodiment of the invention is directed to a method for generating a series of acoustic sources in a liquid, the method comprising: generating and transmitting a plurality of optical pulses through the liquid; the optical pulses reaching ILIB through pulse compression and ionizing a liquid volume, thereby generating a plurality of acoustic pulses, wherein the pulse compression is achieved through at least one of optical group velocity dispersion induced longitudinal compression of a frequency chirped optical pulse and transverse self focusing via a nonlinear optical Kerr effect; and steering each optical pulse with a reflective surface.

Pulse compression can include both optical group velocity dispersion induced longitudinal compression of a frequency chirped optical pulse and transverse self focusing via a nonlinear optical Kerr effect.

The liquid can have a positive or negative optical group velocity dispersion parameter β2, and the optical pulse can have a corresponding negative or positive frequency chirp. In some embodiments, the optical pulse has a wavelength varying linearly with time. In other embodiments, the optical pulse can be a monochromatic optical pulse or a broadband optical pulse without chirp.

DETAILED DESCRIPTION OF PREFERRED EMBODIMENTS

The method for remotely generating an acoustic source in water or another liquid having optical group velocity dispersion is a photo-acoustic sound generation technique, capable of generating an acoustic pulse at a predetermined remote underwater location many meters from the laser source. The remote acoustic generation occurs in two phases: 1) underwater laser pulse propagation and compression using some combination of group velocity dispersion-induced longitudinal compression, and transverse focusing due to the nonlinear refractive index of the liquid, and 2) laser-induced breakdown, heating and vaporization of a liquid volume, followed by rapid expansion and generation of a shock wave that can serve as a useful acoustic pulse.

Figure 1A:
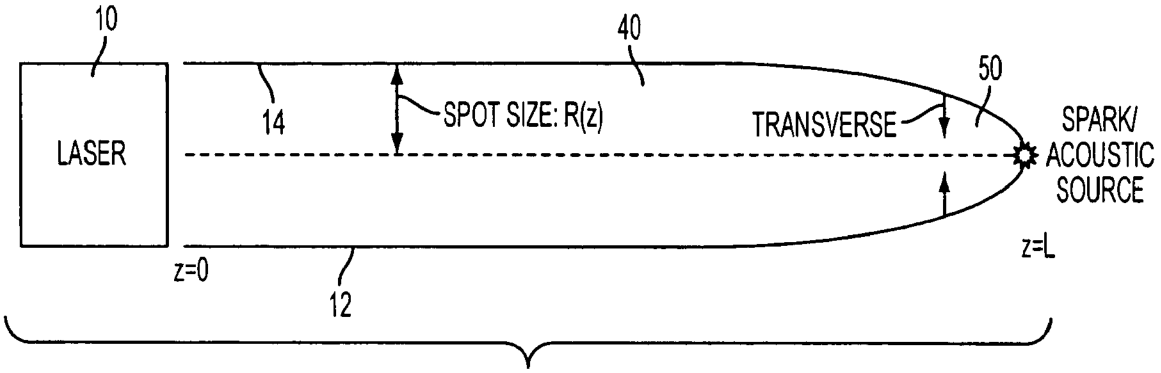
FIG. 1A is a schematic view of a method for remotely generating an acoustic source according to an embodiment of the invention.
Figure 1B:
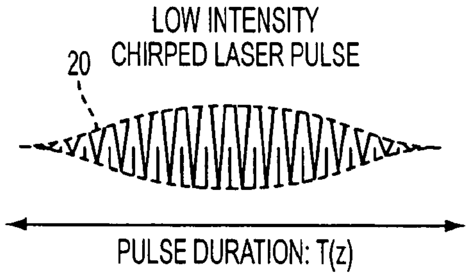
FIG. 1B illustrates a negatively chirped optical pulse before propagation.
Figure 1C:
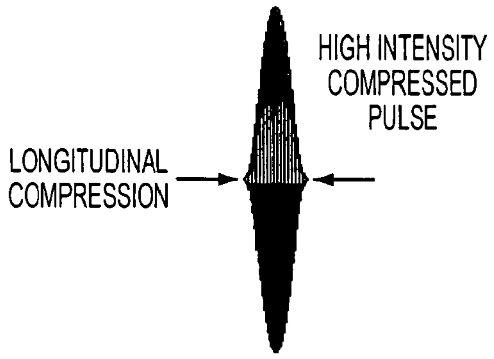
FIG. 1C illustrates the optical pulse of FIG. 1B after propagation and longitudinal compression.

FIGS. 1A-1C illustrate schematically the system and method for remotely generating an acoustic source according to an embodiment of the invention. A laser source 10 generates an optical pulse 20. The optical pulse 20 travels a distance in the water or other liquid having group velocity dispersion, characterized by the parameter $\beta_2$. The optical pulse is both transversely and longitudinally compressed as it travels, until the intensity of the pulse is sufficient to cause laser induced breakdown. The propagation paths of the outer edges of the optical pulse are depicted by two solid lines 12 and 14, showing non-linear Kerr self-focusing of the pulse. The pulse simultaneously undergoes longitudinal compression due to group velocity dispersion.

The wavelength of the laser is preferably selected to be a wavelength having a low attenuation in the water or other desired liquid, as attenuation can be a strong function of the wavelength $\lambda$. Attenuation of light in water can be characterized by an attenuation length $L_{atten}$, with the beam intensity decreasing with propagation distance z according to $I(z)=I(0) \exp(-z/L_{atten})$. In pure water, maximum transmission (and minimum absorption) occurs generally in a wavelength range of 300-500 nanometers, with a maximum attenuation length in this range of approximately 50 meters. For sea water, the attenuation length, $L_{atten}$, is a function of impurity concentrations, with typical values of 5 to 10 meters. The global average $L_{atten}$ is approximately 4 meters, and for relatively clear ocean water $L_{atten}$ can be 10 meters or greater. For embodiments in which the maximum energy is required at the acoustic source, the propagation path length should be selected to be less than $L_{atten}$. For applications requiring lower energy, the total underwater propagation path can be a few times greater than the attenuation length.

For optimal transmission in water, the wavelength $\lambda$ of the optical pulse can be between about 300 nm and 500 nm, greater or lesser. In one embodiment, a commercially available broadband short pulse 800 nm wavelength laser generates pulses of about 50 femtoseconds in duration, and a frequency doubling crystal converts a portion of the energy to a wavelength of 400 nanometers. In another embodiment, an Nd:glass laser produces pulses of about 5 nanoseconds in duration at a wavelength of 1054 nanometers , and a frequency doubler converts a portion of the energy to a 527 nanometer wavelength.

The pulse 20 is preferably frequency chirped, with the wavelength and the frequency being a function of time. For liquids such as water, where $\beta_2$ is positive, the pulse must be negatively frequency chirped, so that the pulse has a shorter wavelength at the head of the pulse and a longer wavelength at the end of the pulse. Such a negatively chirped pulse in a liquid having a positive $\beta_2$ will compress longitudinally as it propagates. For a liquid with linear group velocity dispersion, the wavelength of the pulse should be a linear function of time for optimal longitudinal pulse compression.

The chirped pulse can be generated by optical grating-based dispersion such as that occurring in a chirped pulse amplifier laser, or by any suitable method.

Longitudinal compression of the optical pulse as it travels through the liquid relies on the group velocity dispersion (GVD) parameter of the liquid, $\beta_2$. The GVD parameter, $\beta_2$, is proportional to the rate of change of group velocity of light with wavelength $\partial v_g/\partial\lambda$ over a range of frequencies, and is positive for water. Therefore, in water, the light with a longer wavelength travels faster than light with a shorter wavelength. For an optical pulse with negative frequency chirp, the initial shorter wavelength portions of the optical pulse travel slower through the liquid than the later, longer wavelength portions. The pulses are thus longitudinally compressed, so the pulse duration is shortened as the optical pulses travel through the liquid. For a negatively chirped pulse in which the wavelength of the pulse is a linear function of time in a medium with linear GVD, the propagation distance $L_{GVD}$ needed to produce maximum longitudinal pulse compression is approximately equal to $T(0)/\beta_2\delta\omega$, where T(0) is the initial pulse duration and $\delta\omega$ is the frequency bandwidth. Control and variation of the initial pulse length T(0) and/or the laser bandwidth $\delta\omega$ provides control of the of the longitudinal compression range.

As the pulse duration is shortened through the longitudinal compression, the intensity of the pulse increases, as illustrated in FIG. 1C.

Transverse compression of the pulse occurs generally when the optical intensity of the pulse is sufficiently high to induce nonlinear optical effects. The threshold intensity above which nonlinear optical effects are induced is represented by $P_{NSF}=\lambda^2/2\pi n_0 n_2$, where $n_0$ is the linear index of refraction and $n_2$ is the nonlinear index of refraction, and an approximation of the overall index of refraction to the lowest order in the pulse intensity is $n=n_0+n_2I$. As an example, for light with a wavelength of 400 nm, $P_{NSF}$ is on the order of 1 megawatt in water.

In light with high intensities (light with power above $P_{NSF}$), the intensity excites a significant nonlinear response of the refractive index (the Kerr optical effect). The nonlinear refractive index induces a transverse nonuniformity of the beam or pulse, with a higher index of refraction seen in the center of the beam compared to the transverse outer portions of the beam or pulse, resulting in self-focusing of the beam or pulse.

A characteristic distance for the transverse nonlinear self focusing is approximately $$L_{NSF} = \frac{z_R}{\sqrt{\frac{P(z)}{P_{NSF}} - 1}},$$

where $z_R$ is the Raleigh range and is equal to $z_R=n_0\pi R^2/\lambda$, and R is the initial beam radius. For optimal pulse compression in a given medium, $L_{NSF}$ is therefore determined by P(0) and R, which should be set such that $L_{NSF}=L_{GVD}$ and longitudinal and transverse compression occur simultaneously.

In a preferred embodiment, the initial beam size and initial beam power P(0) are selected so the $P_{NSF}$ threshold will be exceeded during propagation, thereby inducing nonlinear effects, and the transverse self focusing and longitudinal compression occur simultaneously. Simultaneous longitudinal and transverse optical pulse compression can then occur at a chosen distance, which can be less than or greater than the optical attenuation length.

Referring again to FIG. 1A, in an initial portion 40 of the path length L, GVD longitudinal compression increases the intensity of the negatively chirped optical pulse, triggering a non-linear transverse self-focusing effect. The intensity at any point z along the propagation direction can be represented as $$I(z) = \frac{R^2(0)\,T(0)}{R^2(z)\,T(z)} I(0) \exp\left(\frac{z}{L_{atten}}\right).$$

In a second portion 50 of the path length, both longitudinal and transverse compression occur, further increasing the intensity of the light energy in the pulse. Convergence during nonlinear self focusing extends over a distance of only a few centimeters in a preferred embodiment.

Note that FIGS. 1A-1C are not to scale, and the transverse width is exaggerated to illustrate the NSF effect.

Figure 3:
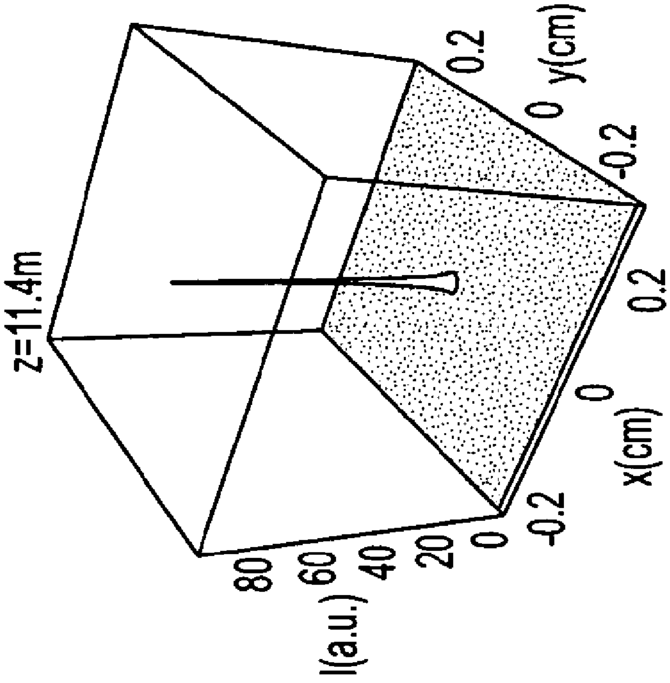
FIG. 3 shows the calculated intensity of a laser generated optical pulse of FIG. 2 after a computer simulation of propagation through water, according to an embodiment of the invention.
Figure 2:
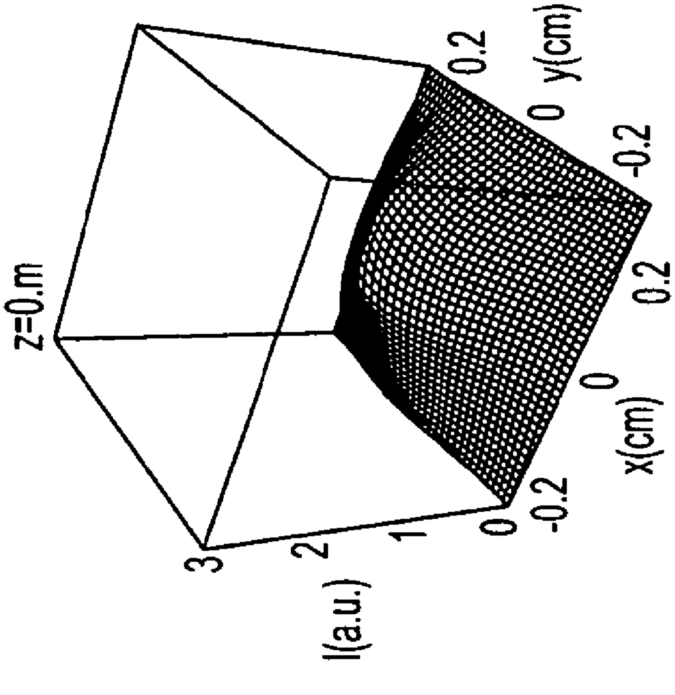
FIG. 2 shows a typical intensity profile of a laser generated optical pulse before propagation through a liquid.

FIGS. 2 and 3 illustrate the results of a computer simulation of underwater laser pulse propagation, to show the effects of group velocity dispersion and nonlinear self focusing on an optical pulse. In this example, the laser is a commercially available frequency doubled chirped pulse amplified ultrashort pulse laser, and the optical pulse has a wavelength of 400 nm, an initial pulse duration T(0) of 100 picoseconds, an initial pulse energy E(0) of 0.55 mJ, an initial beam radius R(0) of 0.29 cm, and a frequency bandwidth $|\delta\omega/\omega|$ of 2.5%. The medium through which the optical pulses travel is water, with a GVD parameter $\beta_2$ of $8\times10^{-28}$ $s^2$/cm, a Kerr index $n_2$ of $4.5\times10^{-16}$ $cm^2$/W, a linear index $n_0$ of 1.3, and an absorption coefficient of $\alpha$=0.1 $m^{-1}$. FIG. 2 illustrates the intensity profile of the initial pulse, and FIG. 3 illustrates the intensity profile of the pulse after propagating through a distance of 11.4 meters. FIG. 3 shows the extreme transverse self compression caused by the nonlinear self focusing effect, producing an intensity level several orders of magnitude increased from the initial level.

Figure 5:
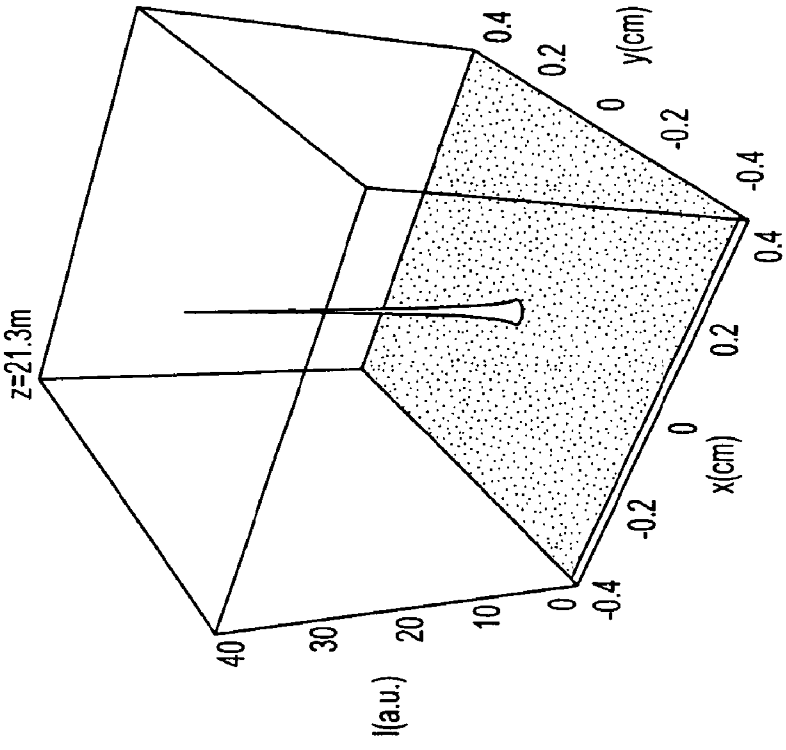
FIGS. 4 and 5 illustrate the calculated amount of pulse compression when propagating through water a distance approximately twice the attenuation length, according to an embodiment of the invention.
Figure 4:
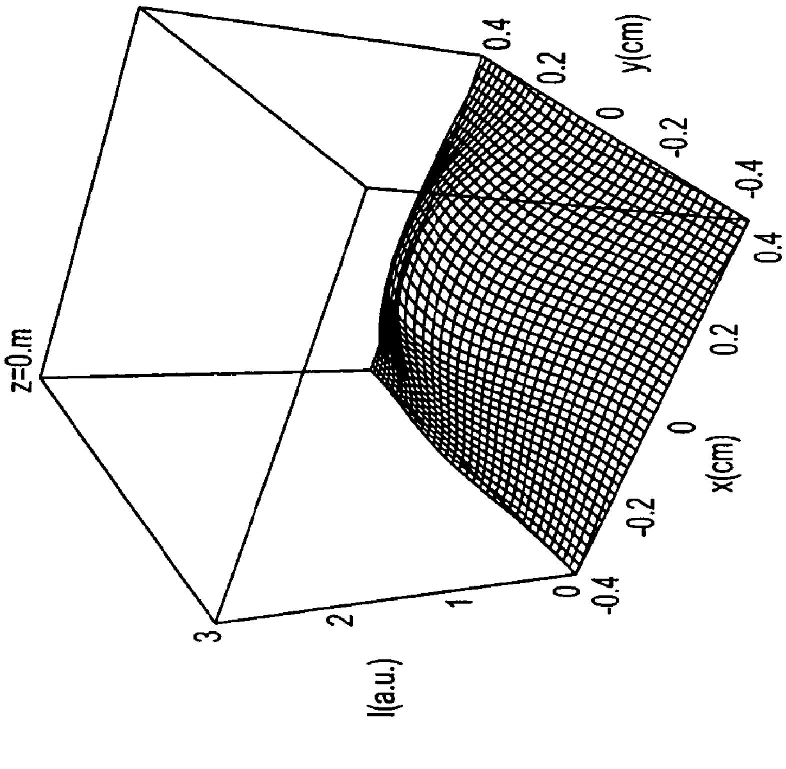

FIGS. 4 and 5 illustrate the amount of pulse compression when propagating for a distance twice the attenuation length. The initial optical pulse has a wavelength of 400 nm, an initial pulse duration T(0) of 200 picoseconds, an initial pulse energy E(0) of 2.2 mJ, an initial power level P(0) of 40 $P_{nsf}$, an initial beam radius R(0) of 0.43 cm, and an initial noise amplitude of 10%. The medium through which the optical pulses travel is water, with a GVD parameter $\beta_2$ of $8\times10^{-28}$ $s^2$/cm, a Kerr index $n_2$ of 4.5×10-16 $cm^2$/W, a linear index $n_0$ of 1.3, and an absorption coefficient of $\alpha$=0.1 $m^{-1}$. FIG. 4 illustrates the intensity profile of the initial optical pulse, and FIG. 5 illustrates the intensity profile of the pulse after propagating through a distance of 21.3 meters.

When the intensity of the optical pulse increases sufficiently to cause laser induced breakdown in the liquid, the liquid in a small region of high intensity ionizes. A threshold intensity for laser induced breakdown (LIB), $I_{LIB}$, is a function of pulse length and wavelength. In water at visible wavelengths, for a pulse length of 1 picoseconds, $I_{LIB}$ is experimentally determined to be in the range of $10^{11}$ to $10^{12}$ W/$cm^2$, depending on wavelength and measurement technique. Although not wishing to be bound by theory, it is noted for clarity that laser induced breakdown can have two mechanisms. One mechanism is multi-photon ionization by intense illumination, and is the only ionization mechanism for laser pulses shorter than approximately 100 femtoseconds. A second additional, slower mechanism is avalanche ionization for significantly longer laser pulses. Avalanche ionization consists of laser excitation of a small number of "seed" free electrons, followed by collisional ionization by these electrons.

When the initial beam size is large and the initial power is sufficiently high, longitudinal compression alone can be enough to raise the intensity level of the pulse to $I_{LIB}$ without significant transverse compression.

For monochromatic light, GVD does not play a role and only NSF-induced transverse focusing will occur for powers above $P_{NSF}$. As discussed above, when the intensity reaches $I_{LIB}$, ionization will produce an acoustic pulse.

Following ionization, the plasma formed by ionization strongly absorbs laser pulse energy, causing rapid vaporization and heating of the ionized volume. This heating occurs on laser pulse time scales, which are extremely short compared to acoustic transit times, so little or no significant expansion of the superheated vapor occurs during the laser pulse.

Figure 7:
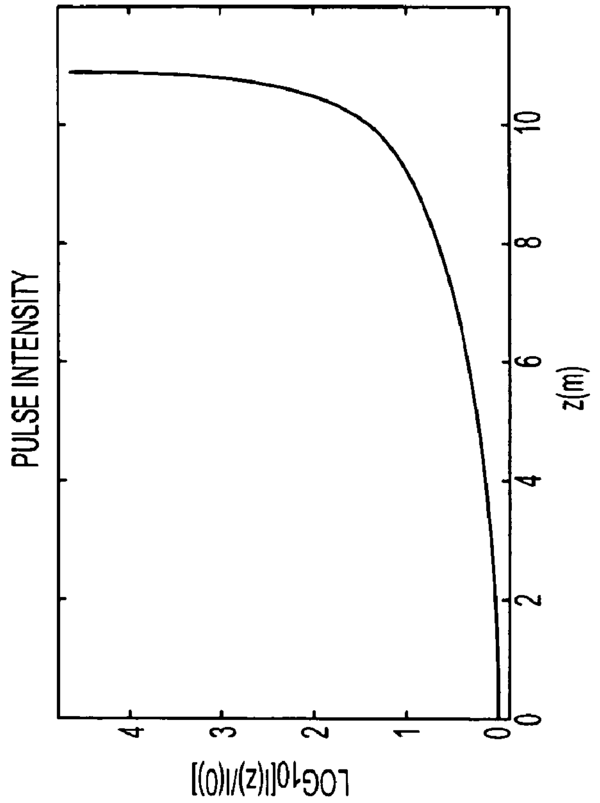
FIGS. 6 and 7 illustrate computer simulations showing the effect of pulse compression on the pulse duration, spot size, and pulse intensity.
Figure 6:
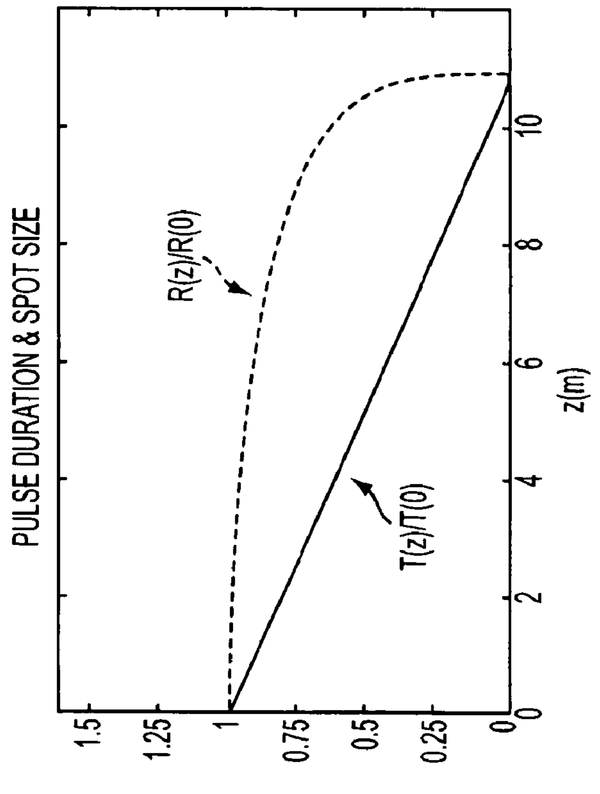

FIGS. 6 and 7 illustrate computer simulations showing the effect of pulse compression on the pulse duration, spot size, and pulse intensity. In this simulation, the initial optical pulse has a wavelength of 400 nm, an initial pulse duration T(0) of 100 picoseconds, an initial pulse energy E(0) of 1 mJ, an initial power level P(0) of 40 $P_{nsf}$, an initial beam radius R(0) of 0.33 cm, frequency bandwidth $|\delta\omega/\omega|$ of 2.5%, and negative chirp. The water has a GVD parameter $\beta_2$ of $8\times10^{-28}$ $s^2$/cm, a Kerr index $n_2$ of 4.5×10-16 $cm^2$/W, a linear index $n_0$ of 1.3, and an absorption coefficient of $\alpha$=0.1 $m^{-1}$. The corresponding $P_{nsf}$ for 400 nm wavelength is approximately equal to 0.42 MW.

Following the rapid heating of the ionized volume, supersonic expansion and shock generation occurs more slowly, at an acoustic transit time $\tau_s$ approximately equal to d/$v_s$, where $v_s$ is the shock speed and d is the size of the ionized volume. Initial shock speed can be a few multiples of the acoustic velocity for typical laser energies.

The acoustic pulse length of the generated acoustic pulse can be determined by the acoustic transit time across the ionized volume in the direction of sound propagation, for a pulse that is a superposition of shock fronts generated from each initial point of supersonic expansion. Thus, larger ionized volumes, and the higher laser pulse energies required to produce them, produce longer acoustic pulses. Embodiments of the invention also include a method of controlling the duration of the acoustic pulse by tailoring the size of the ionized volume through variation of the laser pulse energy.

Note that the acoustic pulse length is not necessarily the same in all directions of acoustic propagation. Embodiments of the invention include a step of adjusting the acoustic pulse by tailoring the shape of the ionized volume. For example, a laser pulse can be launched in which only GVD-induced longitudinal compression to LIB intensity occurs, thereby producing a disc-shaped ionized volume. This can produce longer acoustic pulse lengths in acoustic propagation directions parallel to the plane of the disc. Alternatively, for applications requiring only short underwater laser propagation distances without LIB range reproducibility, optical pulses with little or no frequency chirp can be generated that rely only on nonlinear self focusing effects to bring the pulse to LIB intensities.

When the laser wavelengths are in the range of 300-550 nm, acoustic generation can be accomplished remotely by underwater laser pulse propagation through distances up to or greater than the attenuation length (up to tens of meters in seawater). In contrast, when laser wavelengths are in the infrared range of about 1-10 microns, acoustic generation is confined to distances a few centimeters from the laser source. Laser induced breakdown, vaporization of the liquid, and shock generation for laser acoustic generation is also more efficient by several orders of magnitude than photoacoustic generation via laser heating and thermal expansion of water.

The laser 10 used to generate the optical pulse can be located in air or another gaseous medium, with the optical pulses being transmitted for a distance in the air, and into the liquid medium.

In another embodiment, the laser 10 can be located in the liquid itself, with the optical pulses being transmitted through a window into the liquid. It is not necessary for the optical pulses to be generated and propagated any distance in air before being transmitted into the liquid.

Embodiments of the invention are also directed to acoustic generation systems having applications in surgery, navigation, sonar, communications, and countermeasures for acoustically-guided undersea weapons and devices.

Figure 8:
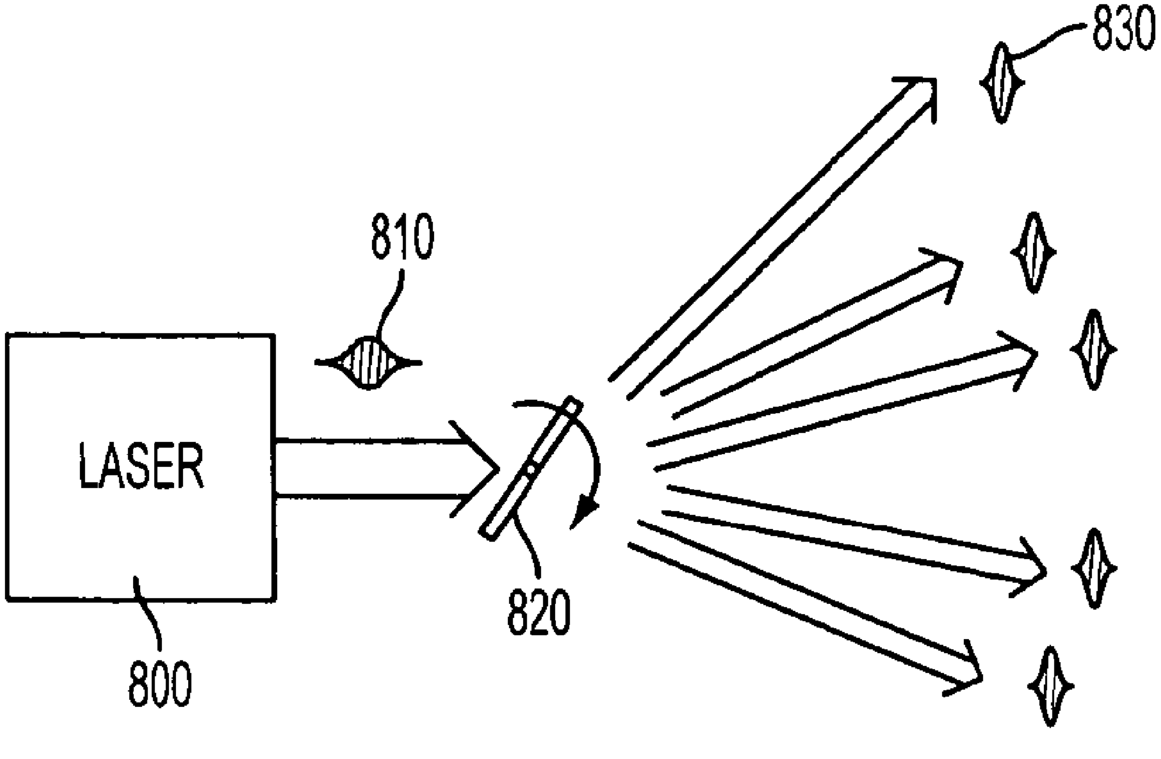
FIG. 8 illustrates a system including a repetitively pulsed laser with a moving mirror for generating multiple acoustic pulses in different locations, in accordance with an embodiment of the invention.

In an embodiment illustrated in FIG. 8, repetitively pulsed laser 800 can generate optical pulses 810 that are steered by a moving mirror or other steering mechanism 820. As the mirror rotates, optical pulses steered along the arc generate acoustic pulses 830 in the desired sequence and locations. These acoustic pulses can form a large acoustic aperture sonar source for high resolution acoustic imaging and multistatic acoustic scattering. The acoustic sources can be generated at a high pulse rate and timed and positioned so they form an acoustic phase front of a large aperture acoustic pulse.

Figure 9:
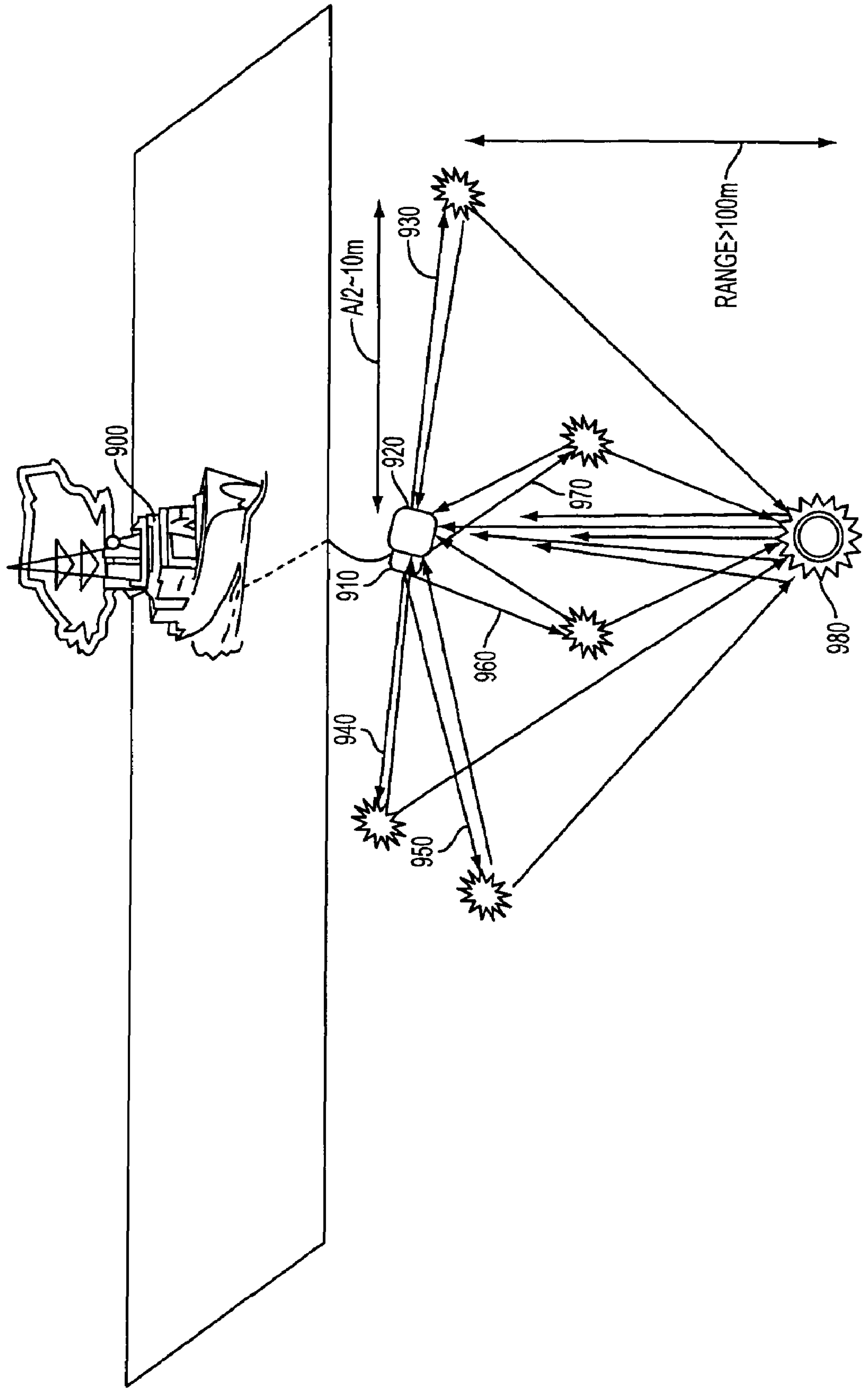
FIG. 9 illustrates a system in which a laser and acoustic detector locate and image an underwater target such as a mine through acoustic pulse generation, in accordance with an embodiment of the invention.

As an example, FIG. 9 illustrates a system in which a laser 910 and acoustic detector 920 are on an underwater platform, possibly tethered to a surface ship 900. The laser generates a series of optical pulses 930, 940, 950, 960, 970, which in turn compress and generate acoustic pulses. These acoustic pulses propagate and are reflected by the target 980, which can be a mine or other object. The acoustic detector receives the reflected acoustic signals from the mine. Because the locations of the optical pulses generated by the laser are known based on the chosen laser pulse compression range and steering mechanism setting, the system accurately determines position and reconstitutes an image of the target. The acoustic detector and/or laser can also be located on an undersea vehicle not tethered to a surface ship or a on a stationary undersea device.

Another embodiment is directed to a countermeasures system in which the acoustic pulses are generated so they replicate an acoustic signature of different mechanical systems.

Figure 10:
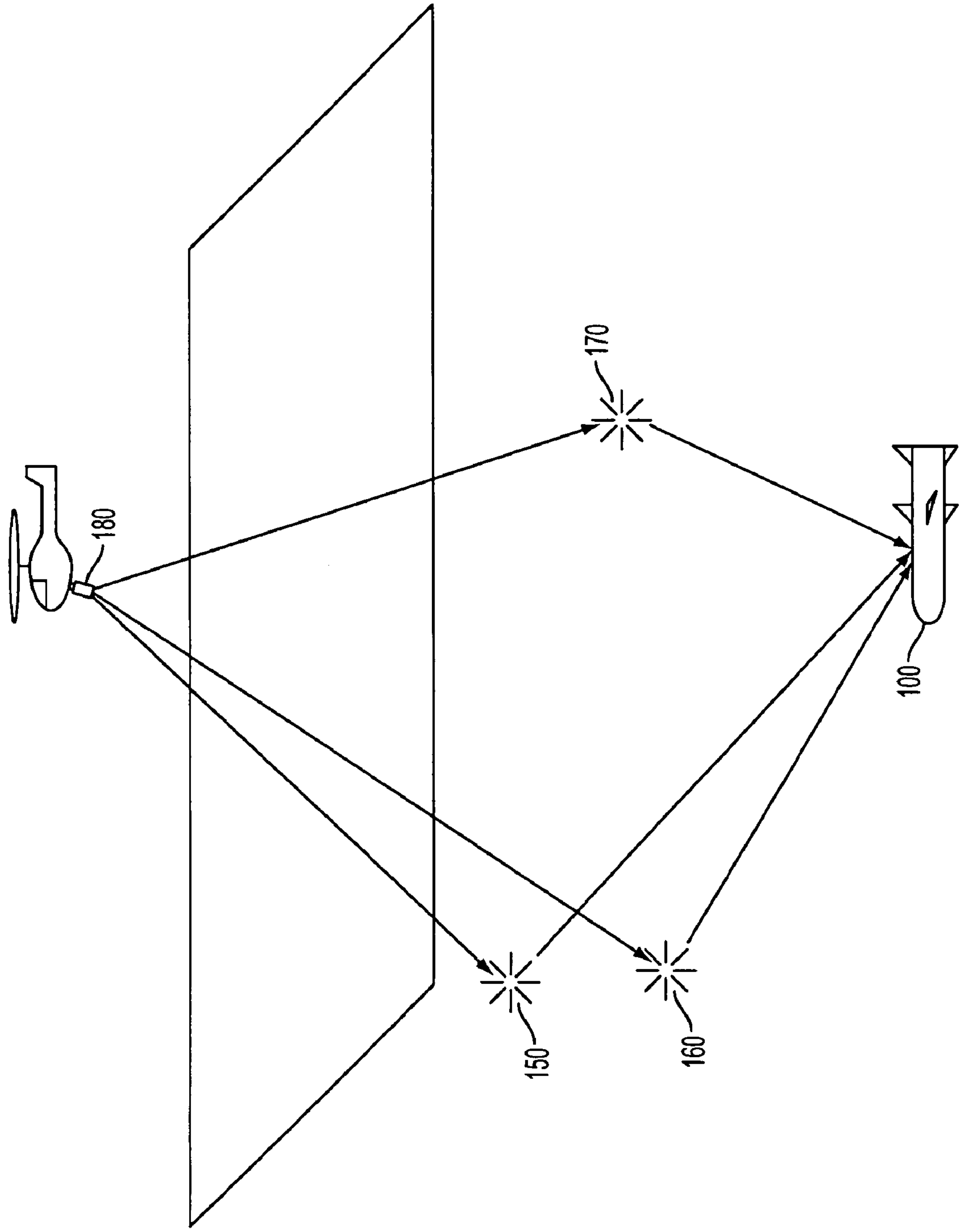
FIG. 10 illustrates a system in which acoustic pulses are formed at expected positions and times, allowing an undersea vehicle to determine its position through triangulation, according to an embodiment of the invention.

Another embodiment is directed to a navigation system useful for accurate identification of the position of an undersea vehicle, for example, an autonomous undersea vehicle (AUV), and is illustrated in FIG. 10. Note that GPS is not available without an in-air antenna, so AUVs can have difficulty maintaining accurate position information during lengthy underwater transits. One or more acoustic pings 150, 160, and 170 are generated by a laser 180 carried by a surface ship, aircraft, or satellite at prearranged locations and timings. The AUV 100 receives the acoustic pings, and can identify its position by triangulation, analogously to a GPS device triangulating via GPS radio signals.

Obviously, many modifications and variations of the present invention are possible in light of the above teachings. It is therefore to be understood that the claimed invention may be practiced otherwise than as specifically described.

Another embodiment includes a focusing lens near the laser, where the optical pulse begins its underwater propagation. Initial optical pulse intensity is limited by filamentation instabilities. The lens can serve to collect and transversely focus more pulse energy than would otherwise be possible given this intensity limit and the collimated beam size required for non-linear transverse self-focusing at a given distance.

The invention has been described with reference to certain preferred embodiments. It will be understood, however, that the invention is not limited to the preferred embodiments discussed above, and that modification and variations are possible within the scope of the appended claims.

The invention claimed is:

1. A method for generating an acoustic source in a liquid, the method comprising:

transmitting an optical pulse through the liquid;

the optical pulse reaching $I_{LIB}$ through pulse compression and ionizing a liquid volume, thereby generating an acoustic pulse, wherein the pulse compression is achieved through at least one of a) optical group velocity dispersion induced longitudinal compression of a frequency chirped optical pulse and b) transverse self focusing via a nonlinear optical Kerr effect.

2. The method according to claim 1, wherein the liquid is water.

3. The method according to claim 1, wherein the liquid is seawater.

4. The method according to claim 1, wherein the pulse compression includes both optical group velocity dispersion induced longitudinal compression of a frequency chirped optical pulse and transverse self focusing via a nonlinear optical Kerr effect.

5. The method according to claim 1, without lens focusing of the optical pulse.

6. The method according to claim 1, with lens focusing of the optical pulse.

7. The method according to claim 1, without an opaque target located in a path traveled by the optical pulse.

8. The method according to claim 1, wherein the optical pulse has a wavelength between 300 and 500 nanometers.

9. The method according to claim 1, wherein the optical pulse has a wavelength less than 10 microns.

10. The method according to claim 1, wherein the optical pulse travels through the liquid for a the distance is of at least one meter.

11. The method according to claim 10, wherein the distance is between 1 and 50 meters.

12. The method according to claim 1, wherein the optical pulse is a negatively chirped optical pulse.

13. The method according to claim 1, wherein the optical pulse is a negatively chirped optical pulse, and the liquid has a positive optical group velocity dispersion parameter $\beta_2$.

14. The method according to claim 1, wherein the optical pulse is a positively chirped optical pulse.

15. The method according to claim 1, wherein the optical pulse is a positively chirped optical pulse, and the liquid has a negative optical group velocity dispersion parameter $\beta_2$.

16. The method according to claim 1, wherein the optical pulse is a monochromatic optical pulse.

17. The method according to claim 1, wherein the optical pulse is a broadband optical pulse without chirp.

18. The method according to claim 1, wherein the optical pulse has a wavelength varying linearly with time.

19. The method according to claim 1, wherein the longitudinal compression distance is proportional to an initial pulse duration of the optical pulse divided by a frequency bandwidth of the optical pulse.

20. The method according to claim 1, wherein $P_{NSF}$ is a function of optical pulse wavelength squared divided by the linear index of refraction of the liquid and the nonlinear index of refraction of the liquid.

21. The method according to claim 1, wherein a laser generates the optical pulse.

22. The method according to claim 1, wherein the optical pulse is generated within the liquid.

23. The method according to claim 1, wherein the liquid is water and the optical pulse is generated underwater.

24. The method according to claim 1, wherein the liquid is water, and the optical pulse is generated in air and is transmitted into the water.

25. A method for generating a series of acoustic sources in a liquid, the method comprising:

generating and transmitting a plurality of optical pulses through the liquid;

the optical pulses reaching $I_{LIB}$ through pulse compression and ionizing a liquid volume, thereby generating a plurality of acoustic pulses, wherein the pulse compression is achieved through at least one of a) optical group velocity dispersion induced longitudinal compression of a frequency chirped optical pulse and b) transverse self focusing via a nonlinear optical Kerr effect; and steering each optical pulse with a reflective surface.

26. The method according to claim 25, further comprising:

moving the reflective surface to steer the pulses in different directions.

27. The method according to claim 25, wherein the acoustic pulses form a large aperture acoustic pulse front.

28. The method according to claim 25, further comprising:

a receiver receiving the acoustic pulses; and identifying a location of the receiver based on a sequence of the acoustic pulses.

29. The method according to claim 25, further comprising:

receiving the acoustic pulses; and generating an image of an environment based on the acoustic pulses.

* * * * *